United States Patent
Thybaut (10) Patent No.: US 12,336,448 B2
(45) Date of Patent: Jun. 24, 2025

(54) ASSEMBLY FOR A DOSING SYSTEM OF A SPREADER MACHINE FOR DISTRIBUTING A GRANULAR MATERIAL OR THE LIKE, DOSING SYSTEM AND SPREADER MACHINE

(71) Applicant: Kverneland Group Nieuw-Vennep B.V., Nieuw-Vennep (NL)

(72) Inventor: Maarten Thybaut, Hillegom (NL)

(73) Assignee: Kverneland Group Nieuw-Vennep B.V., Nieuw-Vennep (NL)

( * ) Notice: Subject to any disclaimer, the term of this patent is extended or adjusted under 35 U.S.C. 154(b) by 0 days.

(21) Appl. No.: 16/709,202

(22) Filed: Dec. 10, 2019

(65) Prior Publication Data

US 2020/0214195 A1 Jul. 9, 2020

(30) Foreign Application Priority Data

Jan. 9, 2019 (EP) ..................... 19150946

(51) Int. Cl.
*A01C 17/00* (2006.01)
*A01C 19/00* (2006.01)
*G01F 13/00* (2006.01)

(52) U.S. Cl.
CPC .......... *A01C 17/006* (2013.01); *A01C 17/008* (2013.01); *A01C 19/00* (2013.01); *G01F 13/001* (2013.01); *A01C 17/001* (2013.01)

(58) Field of Classification Search
CPC ..... A01C 17/006; A01C 17/008; A01C 19/00; B22D 41/38; B22D 41/40; B22D 41/24;
(Continued)

(56) References Cited

U.S. PATENT DOCUMENTS

| 1,919,619 | A |   | 4/1930 | Dean |
| 2,235,612 | A | * | 3/1941 | Graney ............... F16K 3/186 |
|   |   |   |   | 251/195 |

(Continued)

FOREIGN PATENT DOCUMENTS

| AU | 2019268186 A1 | 7/2020 |
| CA | 3062196 A1 | 7/2020 |

(Continued)

OTHER PUBLICATIONS

Extended European Search Report in reference to co-pending European patent Application No. 19150951.2 filed Feb. 2, 2019.

(Continued)

*Primary Examiner* — Tuongminh N Pham
(74) *Attorney, Agent, or Firm* — Leason Ellis LLP (57) ABSTRACT

Disclosed is an assembly for a dosing system of a spreader machine for distributing a granular material or the like, which comprises first and second members provided with first and second openings, respectively, and an actuator connected to at least one of the first and second members and configured to provide a driving force between the first and second members, thereby, adjusting an opening size of a dosing opening provided by an overlapping area between the first and second openings, wherein the relative movement is conducted by linear movement of at least one of the first and second members.

12 Claims, 7 Drawing Sheets

(58) Field of Classification Search
CPC ... F16K 3/029; F16K 1/02; F16K 3/03; F16K 3/312; F16K 39/04; B65D 90/587–60; F16H 55/283; F16H 55/26; F16H 21/02; F16H 21/04; F16H 21/10; Y10T 16/644; Y10T 16/645; Y10T 24/1422; Y10T 24/2187; Y10T 24/44615; Y10T 29/5163; Y10T 74/1515; Y10T 74/1532; Y10T 74/1535; Y10T 74/154; Y10T 74/1534; Y10T 74/1595; Y10T 74/18008; Y10T 74/18096; Y10T 74/18224; Y10T 74/18776; Y10T 74/1876; Y10T 74/18768; Y10T 74/1967; Y10T 74/20714; Y10T 74/18104; Y10T 83/6532
See application file for complete search history.

(56) References Cited

U.S. PATENT DOCUMENTS

| | | | | |
|---|---|---|---|---|
| 4,023,713 | A * | 5/1977 | Brotzmann | B01J 8/0035 406/28 |
| 4,097,562 | A * | 6/1978 | Blakeway | F02M 9/06 261/DIG. 39 |
| 4,300,724 | A * | 11/1981 | Reynolds | A01C 7/004 239/654 |
| 5,160,119 | A * | 11/1992 | Lemire | F16K 3/029 138/94.3 |
| 5,501,405 | A * | 3/1996 | Doornek | A01C 15/007 239/683 |
| 6,920,864 | B1 * | 7/2005 | Roche | F02D 9/14 251/212 |
| 7,766,257 | B2 | 8/2010 | Gamble, II | |
| 8,074,904 | B1 | 12/2011 | Hobbs | |
| 2006/0113740 | A1 * | 6/2006 | Green | B60G 21/0556 280/124.107 |
| 2010/0200680 | A1 | 8/2010 | Hobbs, Jr. | |

FOREIGN PATENT DOCUMENTS

| | | |
|---|---|---|
| DE | 102007045905 A1 | 4/2009 |
| EP | 0511714 A2 | 11/1992 |
| EP | 3679778 A1 | 7/2020 |
| SU | 1271364 A3 | 11/1986 |
| UA | 97603 C2 | 2/2012 |

OTHER PUBLICATIONS

Ukranian Office Action for Application No. a 2019 11617, dated Mar. 5, 2024. 12 pages. (including translation) 2024.
New Zealand Office Action issue Jul. 17, 2024 in co-pending New Zealand patent application No. 759492, 5 pages.

* cited by examiner

ASSEMBLY FOR A DOSING SYSTEM OF A SPREADER MACHINE FOR DISTRIBUTING A GRANULAR MATERIAL OR THE LIKE, DOSING SYSTEM AND SPREADER MACHINE

TECHNICAL FIELD

The present disclosure refers to an assembly for a dosing system of a spreader machine for distributing a granular material or the like, a dosing system, and a spreader machine, specifically an agricultural spreader machine.

BACKGROUND

Spreader or distributing machines are used for distributing a granular material or the like. In case of an agricultural spreader machine a fertilizer may be distributed. Document EP 0 511 714 A2 refers to a spreader machine which is provided with an arrangement comprising a spreader disk. The granular material to be distributed by the spreader machine is received in a storage container or tank. From the storage container the granular material is provided to the spreader disk. On its way from the storage container to the spreader disk the granular material is dosed by a dosing system, thereby, controlling the amount of granular material distributed per time.

SUMMARY

The present disclosure relates to an assembly for a dosing system of a spreader machine for distributing a granular material or the like, a dosing system, and a spreader machine which allow for improved dosing of the material to be distributed.

According to one aspect, an assembly for a dosing system of a spreader machine for distributing a granular material or the like is disclosed. The assembly comprises: a first member provided with a first opening; a second member provided with a second opening; and an actuator connected to at least one of the first and second members and configured to provide a driving force for relative movement between first and second members, thereby, adjusting an opening size of a dosing opening provided by an overlapping area in which the first and second openings are overlapping. The relative movement is conducted or performed by linear movement of at least one of the first and second members.

According to another aspect, a dosing system for a spreader machine for distributing a granular material or the like is disclosed, the dosing system comprises the above disclosed assembly.

According to still a further aspect, a spreader machine for distributing a granular material or the like is disclosed, the spreader machine comprising: a storage container for receiving a granular material to be distributed, a spreading device configured for distributing the granular material, and the above disclosed dosing system configured for dosing the granular material received from the storage container to the spreading device.

The relative movement provided for the first and second members allows for fine adjustment (fine-tuning) of the size of the dosing opening which is defined by the overlapping area for the first and second openings, the overlapping area being adjusted according to the relative position between the first and second members. Linear movement can be applied in small steps supporting exact dosing of the granular material.

If the first and the second members are provided in a first relative position or orientation to each other, the opening size of the dosing opening is providing a first size. Changing the relative position or orientation of the first and second members to each other will provide them in a second relative position, thereby, establishing a second opening size of the dosing opening different from the first opening size. For amending or adjusting the size the overlapping area in which the first and second openings are overlapping is adjusted. A closed position may be provided for the dosing opening if there is no overlapping between the first and second openings.

The linear movement or motion is provided by a one-dimensional motion or movement along a straight line.

With regard to a throughput of the granular material through the dosing opening, a throughput of at least about 300 kg/min may be provided in operation.

The assembly may comprise a guiding mechanism configured for linearly guiding at least one of the first and second members for the linear movement. The guiding mechanism, provided for guidance while the at least one of the members is moved, may comprise one or more guiding slots provided, for example, in at least one of the first and second members. Within such guiding slot a pin or projection may be received and guided while the linear movement or motion is conducted.

The assembly may further comprise a first hinge connecting the actuator to the first member. The first hinge may comprise one or more lever arms for connecting the actuator to the first member. In an example an extracting and retracting actuator element of the actuator may be connecting to the first hinge, and, thereby, functioning together with the first hinge for driving linear movement or motion.

The assembly may comprise a second hinge connecting the actuator to the second member. The embodiments or design options outlined for the first hinge above may apply to the second hinge mutatis mutandis.

The second member may be forced movable (forced movement) in response to linear movement of the first member, the linear movement driven by the actuator. If the first member is driven to be moved, such motion of the first member will forcibly cause movement of the second member. In this case relative movement between the first and second members comprises moving both the first and second members. It may be similarly foreseen that the first member is forced to move in case the second member is driven for movement. Thus, synchronized movement or motion of the first and the second members may be applied.

At least one of the first and the second openings may be a square opening. At least one of the first and the second openings may be provided with a square opening having the same length on all sides of the opening, for example, on all four sides of the square opening.

The dosing opening may be a square opening. By the relative movement between the first and second members corner sections of the first and second openings provided opposite to each other may be moved in a closer or more distant position. The dosing opening may be provided with a quadratic opening shape (quadratic opening or hole).

A first shape of the dosing opening, if the first and second openings are in a first overlapping position, may be equal to a second shape of the dosing opening after the first and second openings moved to a second overlapping position different from the first overlapping position. By the relative movement between the first and second members (causing relative movement between the first and second openings) the type of shape of the opening may not change. For example, in the different relative positions between the first and second members the dosing opening may be provided with a square opening (shape). Still, depending on the relative position of the first and second members the dosing opening is provided with different opening size. Depending on the size of the dosing opening more or less granular material can pass through the doping dosing opening.

The first and second members may be configured to synchronously move while conducting the relative movement. With regard to such example or other embodiments, there may be a single actuator for moving both the first and the second members for relative movement. Alternatively, each of the first and second members may be assigned an individual actuator. The actuators may be controlled by a controller device, thereby, also allowing synchronized movement of the first and the second members.

A center portion of the dosing opening may be locally fixed while the relative movement of both the first and second members is conducted. The center of the dosing opening is kept in a non-moved or non-relocated position. If a spreading device located underneath of the assembly does not change its relative position to the assembly, such fixing of the center portion of the dosing opening may ensure keeping a center of the discharging of the granular material to the spreading device while the opening size of the dosing opening is adjusted by relative movement between the first and second members.

For providing the driving force for the relative movement between the first and second members, at least one of a cylinder extractable and retractable, and a toothed-wheel-rack mechanism may be provided. The cylinder may be provided with a hydraulic or a pneumatic cylinder. For the cylinder, a piston may be provided in chamber, the piston being connected to a piston rod which in operation can be extracted and retracted. With regard to the toothed-wheel-rack mechanism, the toothed-wheel may be driven by an electric motor. Two racks may be provided on opposite sides of the toothed-wheel, thereby, driving or moving both racks by rotating the toothed-wheel. The two racks may be connected to the first and the second members, thereby, causing relative movement between the first and second members if the toothed-wheel is driven.

At least one of the first member and the second member may be provided with a plate member. For this or other examples, the first and second members may be located above each other in a vertical direction. Plate members provided for both the and second members may be provided in a parallel position. It may be provided that the first and second members are sliding on each other in case of relative movement between the first and the second members. With regard to the plate members or other embodiments, the first and second openings may be provided in a center area of the first and the second member, respectively.

The embodiments outlined above may apply to at least one of the dosing system and the spreader machine mutatis mutandis. The spreader machine may be an agricultural spreader machine for distributing, for example, a fertilizer.

BRIEF DESCRIPTION OF THE DRAWINGS

Further embodiments are described in further detail by referring to figures, which show:

FIG. 1 is a schematic representation of an arrangement of elements for a spreader machine for distributing a granular material or the like;

FIG. 2 is a schematic perspective view of an assembly for a dosing system of a spreader machine for distributing a granular material or the like;

FIG. 6 is a schematic top view of another assembly for a dosing system of a spreader machine for distributing a granular material or the like.

DETAILED DESCRIPTION

Figure 1:
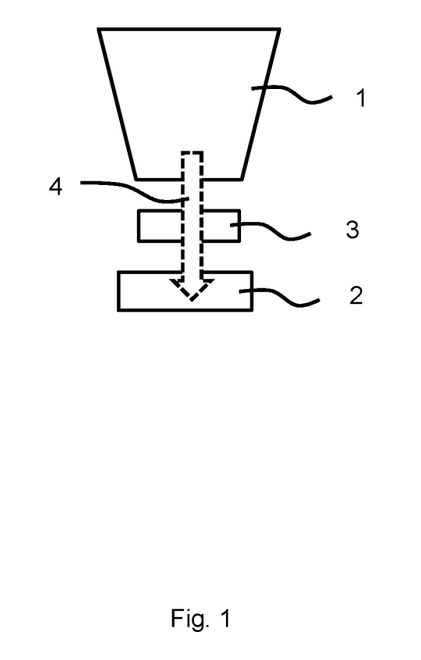
Figure 2:
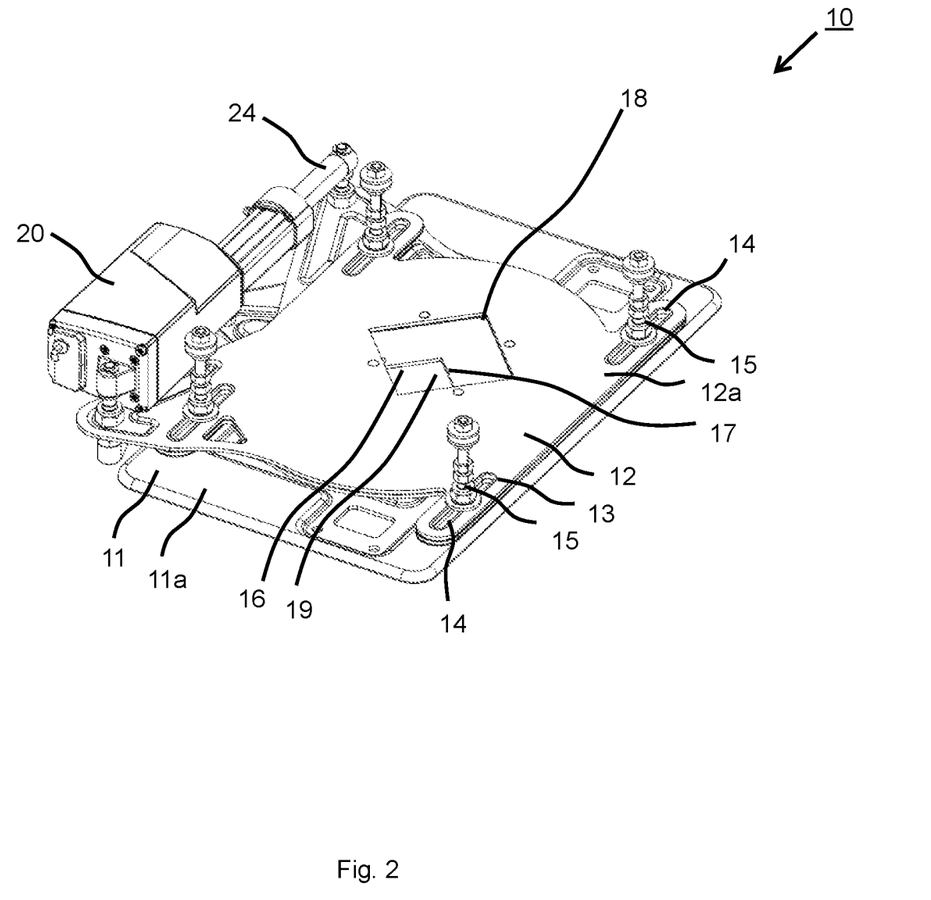
Figure 3:
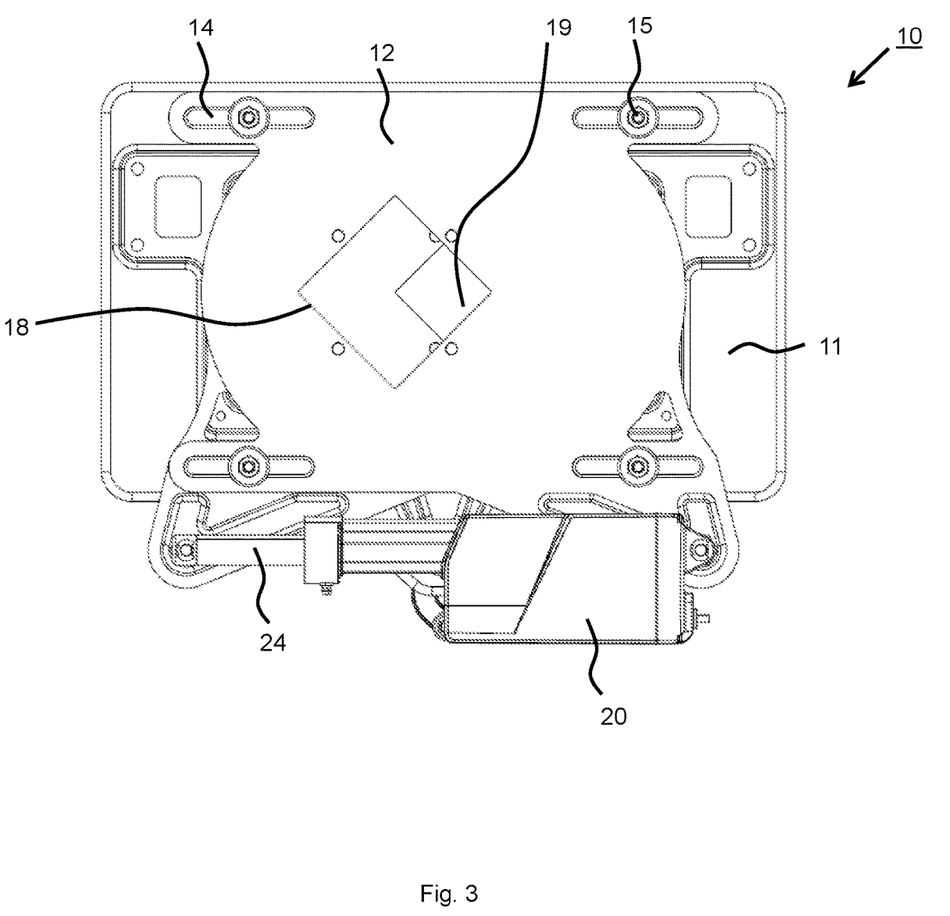
FIG. 3 is a top view of the assembly in FIG. 2.
Figure 4:
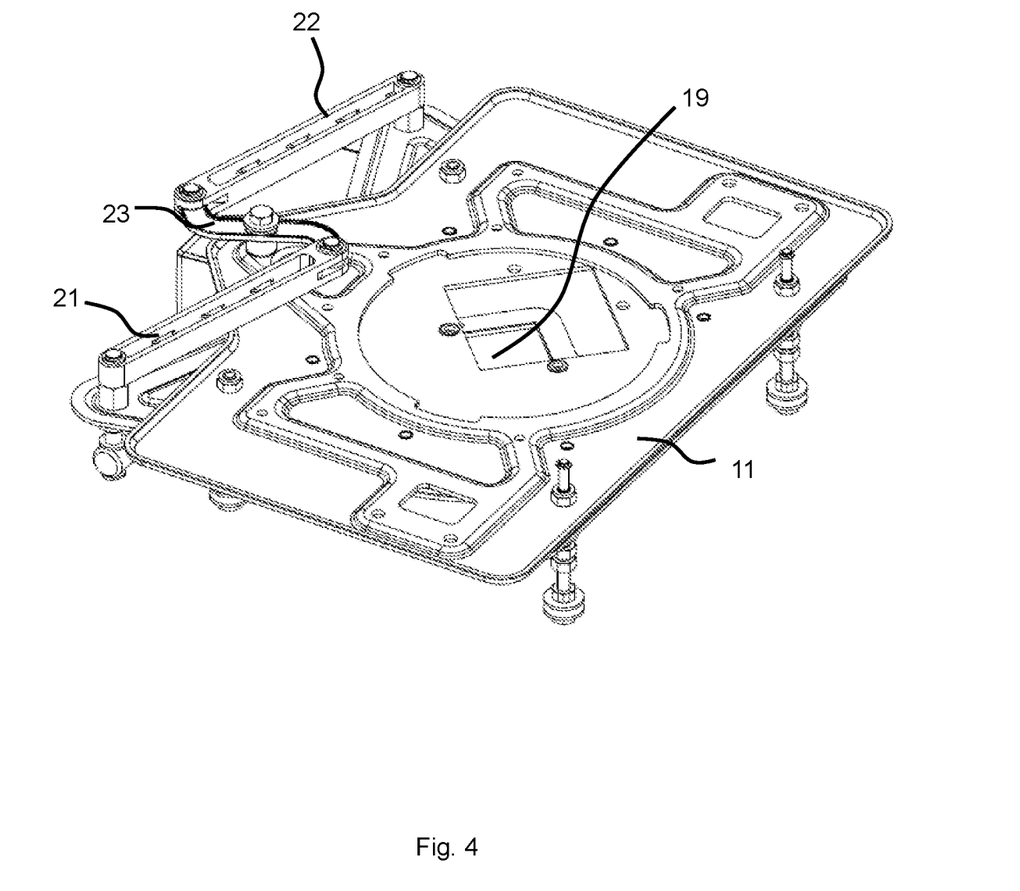
FIG. 4 is a perspective view from the bottom of the assembly in FIG. 2.
Figure 5:
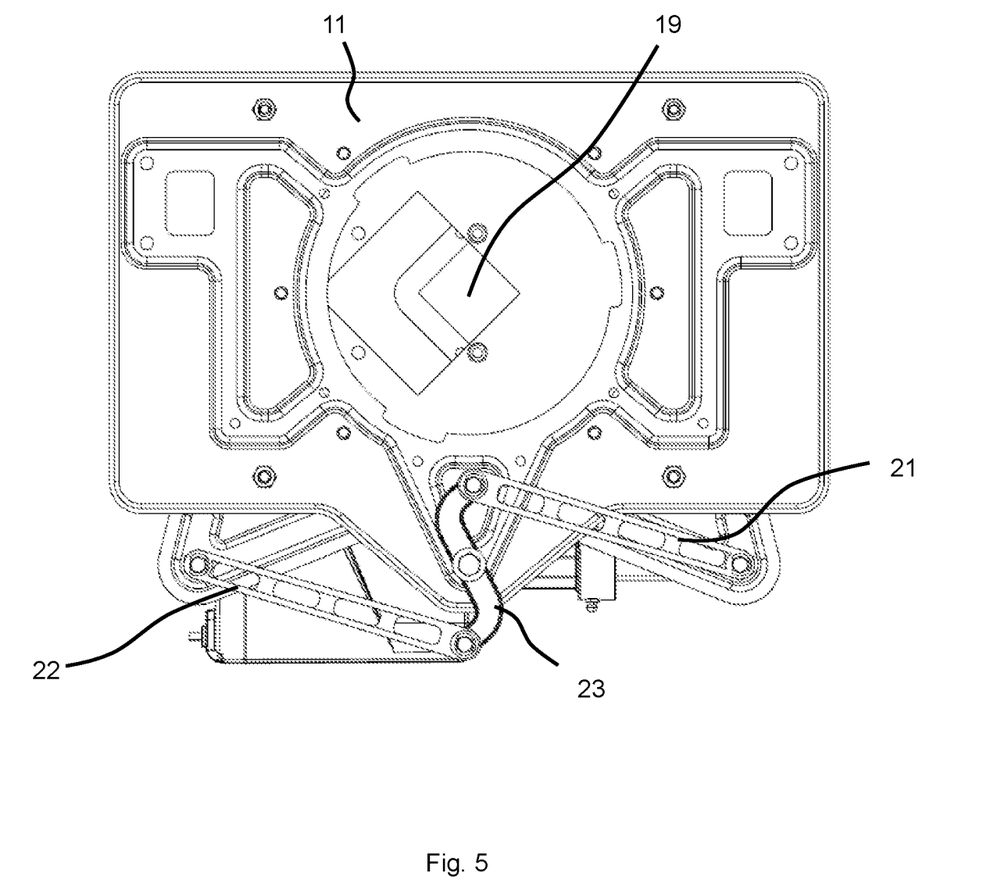
FIG. 5 is a bottom view of the assembly in FIG. 2.

FIG. 1 shows a schematic representation of an arrangement for a spreader or distributor machine such as an agricultural spreader machine, for example, for distributing a fertilizer material. Granular material to be distributed is received in a storage container or tank 1 which may be carried, for example, by a tractor or may be provided on an implement. For spreading or distributing the granular material it is provided to a spreading device 2 comprising, for example, one or two spreader disks as it is known as such for different types of spreader devices. For having the granular material provided from the storage container 1 to the spreading device 2 depending on the work situation, a dosing system 3 is provided between the storage container 1 and the spreader device 2. The granular material to be distributed is provided from the storage container 1 to the dosing system 3 which will dose the granular material to the spreader device 2. This is schematically shown in FIG. 1 by an arrow 4.

With reference to FIGS. 2 to 8, embodiments for an assembly for a dosing system for a spreader machine for distributing a granular material or the like are described. For example, the assembly may be applied in the arrangement depicted in FIG. 1.

FIGS. 2 to 5 show an assembly 10 for a dosing system of a spreader machine. A first member 11 and a second member 12 are provided above each other. In the example shown in FIG. 1 the first and the second member 11, 12 are provided with a plate member 11a, 12a. The first and the second members 11, 12 are movable relative to each other. In case of movement there is a guiding mechanism 13 provided with guiding slots 14 and guiding pins 15 for guiding or supporting linear movement.

By the linear movement an overlapping area 16 in which a first opening 17 provided in the first member 11 and a second opening 18 provided in the second member 12 are overlapping, thereby, providing a dosing opening 19. Through the dosing opening 19 the granular material to be distributed or spread can pass on its way from the storage container 1 to the spreading device 2 (see FIG. 1). By adjusting the overlapping area 16 regarding its size the dosing of the granular material can be controlled.

In the example shown both the first and the second openings 17, 18 are provided with a square opening shape. Also, the dosing opening 19 does have a square shape which is kept in the different relative positions between the first and the second member 11, 12.

For causing relative linear movement between the first and the second members 11, 12 there is an actuator 20 coupling to both the first and the second members 11, 12. There are hinges 21, 22 connecting to a lever arm 23 (see FIGS. 4 and 5). Consequently, if a rod element 24 of the actuator 20 is extracted or retracted both the first and the second member 11, 12 will be forced to linearly move, thereby, adjusting the size of the dosing opening 19. A center portion of the dosing opening 19 will be kept in the same position (not moving).

Figure 6:
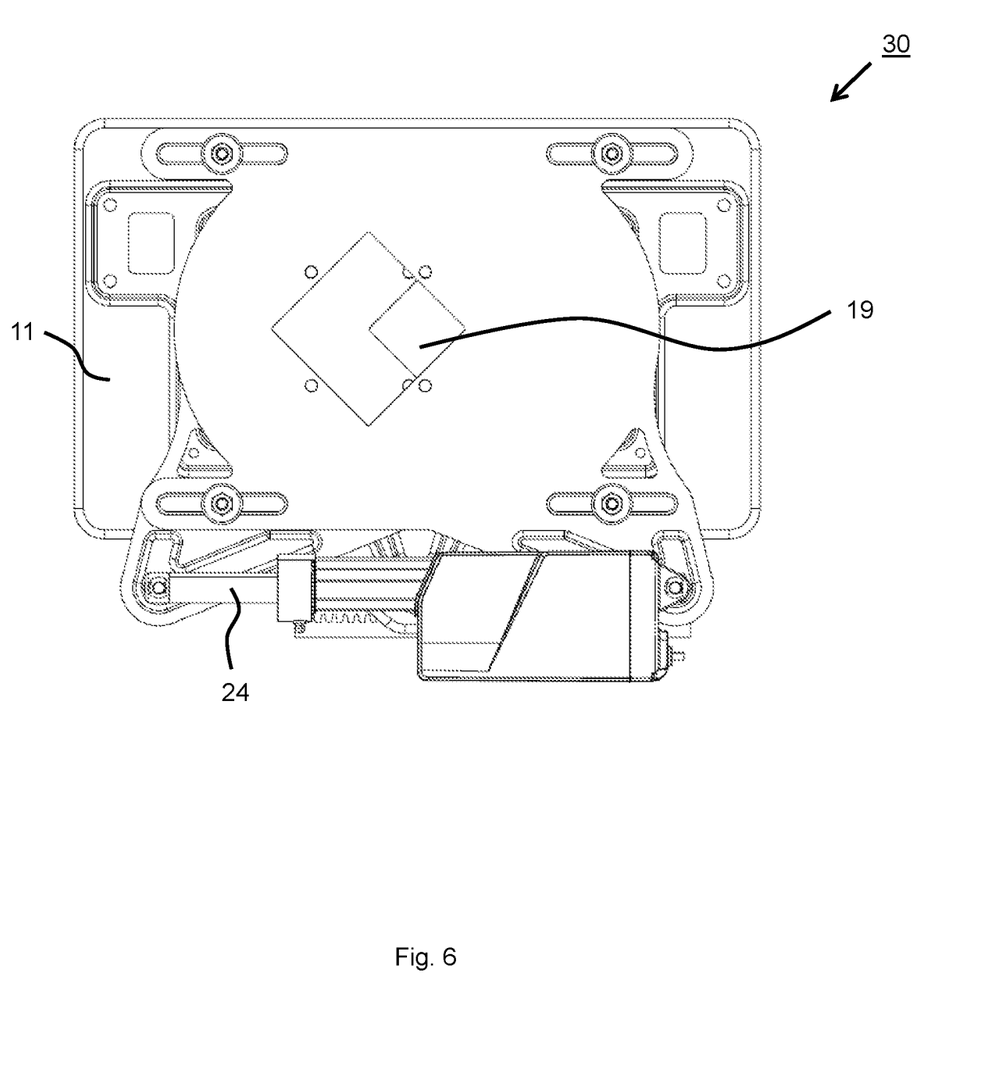
Figure 7:
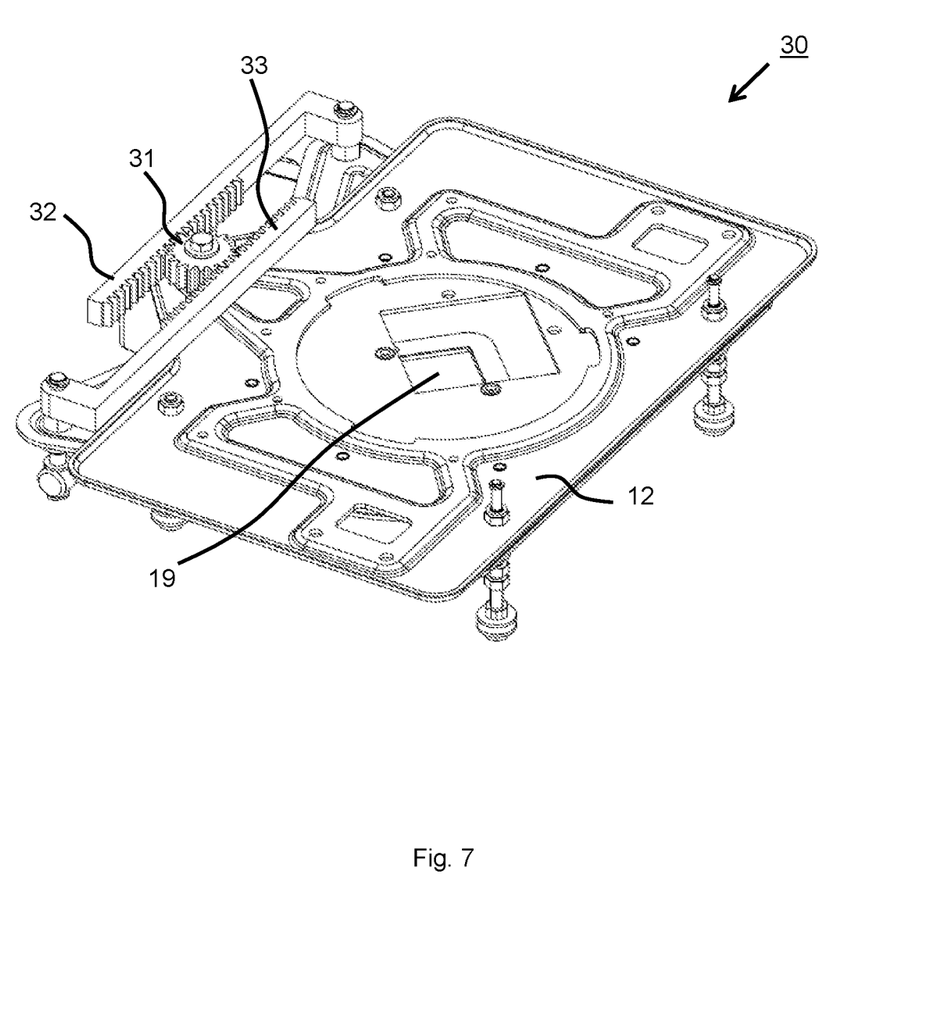
FIG. 7 is a schematic bottom view of the further assembly from FIG. 6.

Referring to FIGS. 6 and 7, another assembly for a dosing system of the spreader machine is depicted. In FIGS. 6 and 7 the same reference numeral are applied to the same features like in FIGS. 2 to 5. Instead of the combination of the hinges 21, 22 and the lever arm 23, there is a toothed wheel 31 interacting with two racks 32, 33 provided on opposite sides of the toothed-wheel 31. Again, if the actuator provides a driving force, both the first and the second members 11, 12 are linearly moved relative to each other.

The features disclosed in this specification, the figures and/or the claims may be material for the realization of various embodiments, taken in isolation or in various combinations thereof.

What is claimed is:

1. An assembly for a dosing system of a spreader machine for distributing a granular material, comprising:
    a first member provided with a first opening;
    a second member provided with a second opening;
    an actuator connected to the first member and configured to provide a driving force to the first member for relative movement between the first and second members, thereby, adjusting an opening size of a dosing opening provided by an overlapping area in which the first and second openings are overlapping; and
    a coupling connecting the first member and the second member such that the second member is forced movable by the coupling in response to a linear movement of the first member when the first member is driven by the actuator via applying the driving force to the first member, wherein the coupling is configured to transmit the driving force from the first member to the second member when the actuator applies the driving force to the first member, such that first member and the second member move relative to each other, wherein the opening size of the dosing opening is adjustable to enable a throughput of granular material of at least about 300 kg/min,
    wherein the actuator includes an extractable and retractable rod that is joined to the first member by a connector and that is linearly extractable and retractable relative to the actuator, and wherein the connector is separate from the coupling.

2. The assembly according to claim 1, further comprising a guiding mechanism configured for linearly guiding at least one of the first and second members for the linear movement.

3. The assembly according to claim 1, wherein the coupling comprises a first hinge connected to the first member.

4. The assembly according to claim 3, wherein the coupling comprises a second hinge connected to the second member and a lever arm, the lever arm connecting the first hinge and the second hinge, the second hinge connecting the lever arm to the second member.

5. The assembly according to claim 1, wherein at least one of the first and the second openings is a square opening.

6. The assembly according to claim 1, wherein, if the first and second openings are in a first overlapping position, the dosing opening is a first shape, and wherein the dosing opening is a second shape after the first and second openings moved to a second overlapping position different from the first overlapping position, wherein the first shape and the second shape are a same type of shape.

7. The assembly according to claim 1, wherein the first and second members are configured to synchronously move while conducting the relative movement.

8. The assembly according to claim 7, wherein a center portion of the dosing opening is locally fixed while the relative movement of both the first and second members is conducted.

9. The assembly according to claim 1, wherein the coupling comprises a first rack connected to the first member, a second rack connected to the second member, and a toothed wheel interacting with the first rack and the second rack.

10. The assembly according to claim 1, wherein at least one of the first member and the second member is provided with a plate member.

11. A dosing system for a spreader machine for distributing a granular material, comprising an assembly according to claim 1.

12. A spreader machine for distributing a granular material, comprising:
    a storage container for receiving a granular material to be distributed;
    a spreading device configured for distributing the granular material and
    a dosing system according to claim 11 configured for dosing the granular material received from the storage container to the spreading device.

* * * * *